US009947307B2

(12) United States Patent
Takasaki et al.

(10) Patent No.: US 9,947,307 B2
(45) Date of Patent: Apr. 17, 2018

(54) ELECTRONIC PERCUSSION INSTRUMENT

(71) Applicant: Roland Corporation, Shizuoka (JP)

(72) Inventors: Ryo Takasaki, Shizuoka (JP); Norihiro Yoshikuni, Shizuoki (JP); Takeshi Osada, Shizuoka (JP); Yutaka Morita, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 15/431,775

(22) Filed: Feb. 14, 2017

(65) Prior Publication Data

US 2017/0236505 A1 Aug. 17, 2017

(30) Foreign Application Priority Data

Feb. 17, 2016 (JP) ................................ 2016-028149

(51) Int. Cl.
*G10H 3/14* (2006.01)
*G10H 3/10* (2006.01)
(Continued)

(52) U.S. Cl.
CPC .......... *G10H 3/146* (2013.01); *G10D 13/024* (2013.01); *G10H 1/0551* (2013.01); *G10H 3/10* (2013.01);
(Continued)

(58) Field of Classification Search
CPC .... G10H 3/146; G10H 3/10; G10H 2230/301; G10H 2230/311; G10H 2230/315; G10D 13/024
(Continued)

(56) References Cited

U.S. PATENT DOCUMENTS 4,852,443 A * 8/1989 Duncan ................ G10H 1/0551 200/600
7,408,109 B1 * 8/2008 Freitas .................... G10H 3/12 84/687
(Continued)

FOREIGN PATENT DOCUMENTS

CN 201477865 5/2010
CN 202905153 4/2013
(Continued)

OTHER PUBLICATIONS

"Search Report of Europe Counterpart Application" , dated Apr. 6, 2017, p. 1-p. 8, in which the listed references were cited.

*Primary Examiner* — David Warren
*Assistant Examiner* — Christina Schreiber
(74) *Attorney, Agent, or Firm* — JCIPRNET

(57) ABSTRACT

Provided is an electronic percussion instrument that is capable of simulating a playing technique for an acoustic percussion instrument. A tubular body part is opened on an axial end surface, and a head is attached to the axial end surface to be struck on the front surface. A capacitance sensor includes an electrode that generates a capacitance with respect to a detected conductor, such as a human body, positioned on the front surface side of the head. Because the capacitance sensor detects a change of a capacitance corresponding to a distance between the electrode and the detected conductor, whether the detected conductor approaches (contacts) the head or presses the head can be determined. As a result, the playing technique for the acoustic percussion instrument is simulated.

20 Claims, 5 Drawing Sheets

(51) Int. Cl.
*G10H 3/00* (2006.01)
*G10D 13/02* (2006.01)
*G10H 1/055* (2006.01)

(52) U.S. Cl.
CPC . *G10H 2230/285* (2013.01); *G10H 2230/301* (2013.01); *G10H 2230/311* (2013.01); *G10H 2230/315* (2013.01)

(58) Field of Classification Search
USPC ........................................................... 84/723
See application file for complete search history.

(56) References Cited

U.S. PATENT DOCUMENTS

| | | | | |
|---|---|---|---|---|
| 7,465,869 B1 * | 12/2008 | Freitas | G10H 3/10 | 84/687 |
| 2006/0021495 A1 * | 2/2006 | Freitas | G10H 3/10 | 84/723 |
| 2008/0238448 A1 * | 10/2008 | Moore | G10H 3/10 | 324/686 |
| 2009/0151475 A1 * | 6/2009 | Masaki | G01L 1/146 | 73/862.68 |
| 2016/0019873 A1 * | 1/2016 | Mori | G10H 1/32 | 84/422.1 |
| 2016/0210941 A1 * | 7/2016 | Suitor | G10H 3/146 | |
| 2016/0307553 A1 * | 10/2016 | Yu | G10H 3/146 | |
| 2017/0116972 A1 * | 4/2017 | Yoshino | G10H 3/146 | |
| 2017/0236505 A1 * | 8/2017 | Takasaki | G10D 13/024 | 84/723 |

FOREIGN PATENT DOCUMENTS

| | | |
|---|---|---|
| CN | 105654934 | 6/2016 |
| JP | 3614124 | 1/2005 |
| JP | 2005-195928 | 7/2005 |

* cited by examiner

ELECTRONIC PERCUSSION INSTRUMENT

CROSS-REFERENCE TO RELATED APPLICATION

This application claims the priority benefit of Japanese patent application no. 2016-028149, filed on Feb. 17, 2016. The entirety of the above-mentioned patent application is hereby incorporated by reference herein and made a part of this specification.

BACKGROUND OF THE INVENTION

Field of the Invention

The invention relates to an electronic percussion instrument and more particularly relates to an electronic percussion instrument that is capable of simulating a playing technique for an acoustic percussion instrument.

Description of Related Art

There are conventional electronic percussion instruments that simulate acoustic percussion instruments, such as drums, in which the open end of a shell is covered by a head and the outer edge ring of the head is pressed and fixed by an annular rim. Open rim shot and closed rim shot are playing techniques for acoustic percussion instruments. Open rim shot is to strike the rim and the head at the same time with a stick and closed rim shot is to strike the rim with a stick while the front surface of the head is held down by the hand that holds the stick.

An electronic percussion instrument (Patent Literature 1) has been proposed in order to present the difference between these playing techniques, in which a first rim shot switch and a second rim shot switch are respectively disposed on the half circumference of the rim. The electronic percussion instrument determines the playing technique to be closed rim shot when the first rim shot switch is turned ON by the striking on the rim, and determines the playing technique to be open rim shot when the first rim shot switch is OFF and the second rim shot switch is ON.

PRIOR ART LITERATURE

Patent Literature

[Patent Literature 1] Japanese Patent Publication No. 3614124

SUMMARY OF THE INVENTION

Problem to be Solved

However, the conventional technique described above may be different from the actual acoustic percussion instrument playing technique.

In view of the above, the invention provides an electronic percussion instrument that is capable of simulating the playing technique for the acoustic percussion instrument.

Solution to the Problem and Effect of the Invention

In view of the above, according to the electronic percussion instrument of an embodiment, a tubular body part is opened on an axial end surface and a head to be struck on a front surface is attached to the axial end surface. A capacitance sensor includes an electrode, which generates a capacitance with respect to a detected conductor, such as a human body, located on the front surface side of the head.

Because the capacitance sensor detects a change of the capacitance corresponding to a distance between the electrode and the detected conductor, whether the detected conductor approaches (contacts) the head or whether the detected conductor presses the head can be determined. As a result, the electronic percussion instrument is capable of simulating the playing technique of acoustic percussion instruments.

According to the electronic percussion instrument of an embodiment, the electrode is disposed on the back surface side of the head, and at least one of a conductor, not connected to a reference potential point, and an insulator is disposed between the front surface of the head and the electrode. That is, a conductor connected to the reference potential point is absent between the front surface of the head and the electrode. Thus, the capacitance sensor is able to detect the change of the capacitance caused by the approach of the detected conductor to the electrode. As a result, the electronic percussion instrument is capable of simulating the playing technique of acoustic percussion instruments.

According to the electronic percussion instrument of an embodiment, a conductor part connected to the reference potential point is disposed on the outer side with respect to the electrode in an axially perpendicular direction of the body part. The conductor part functions as an electrostatic shield. Therefore, the change of the capacitance that the capacitance sensor detects when the conductor, such as human body, approaches the electrode on the outer side in the axially perpendicular direction of the body part with respect to the conductor part is reduced. Accordingly, the electronic percussion instrument is capable of suppressing erroneous detection of the capacitance sensor caused by the approach of the conductor to the electrode on the outer side in the axially perpendicular direction of the body part with respect to the conductor part.

According to the electronic percussion instrument of an embodiment, a bottom part disposed at a predetermined distance from the back surface of the head is fixed to the body part, and a plurality of protruding parts extend from the bottom part toward the head. The electrode is attached to the front ends of the protruding parts and is separated from the head by a predetermined distance. As a result, by respectively setting the heights of the protruding parts, the inclination of the electrode with respect to the bottom part can be set easily.

According to the electronic percussion instrument of an embodiment, the bottom part disposed at a predetermined distance from the back surface of the head is fixed to the body part. The bottom part has an electrode surface, on which the electrode is disposed. The electrode can be easily installed or formed along the shape of the electrode surface. Accordingly, the installation work or formation work of the electrode can be performed easily.

According to the electronic percussion instrument of an embodiment, the electrode is disposed at a predetermined distance from the back surface of the head, and the electrode is inclined so that a surface of the electrode, which faces the head, inclines away from the head toward the inner side in the axially perpendicular direction of the body part. Because the head is close to the electrode on the outer periphery side where the displacement is small during striking, the change of the capacitance that the capacitance sensor detects with respect to the distance between the detected conductor and the head is increased. As a result, the detection accuracy of the capacitance sensor is improved.

Because the head is away from the electrode on the center side where the displacement is large during striking, the head and the electrode are less likely to contact each other. Accordingly, contact between the head and the electrode is suppressed and the detection accuracy of the capacitance sensor is improved.

According to the electronic percussion instrument of an embodiment, because each of the divided electrodes faces or is contact with the head, the position of the detected conductor in the direction parallel to the front surface of the head can be detected.

According to the electronic percussion instrument of an embodiment, because the divided electrodes are formed into substantially the same shape, the capacitance sensor has uniform detection sensitivity for the electrodes. Accordingly, the accuracy of detecting the position of the detected conductor in the direction parallel to the front surface of the head is improved and the detection processes that the capacitance sensor performs for the electrodes are the same.

According to the electronic percussion instrument of an embodiment, the capacitance sensor detects a change of a parasitic capacitance between the electrode and the reference potential point. With use of such a self-capacitance type capacitance sensor, the electrode is simplified. As a result, the component cost of the electrode is reduced.

DESCRIPTION OF THE EMBODIMENTS

Figure 1:
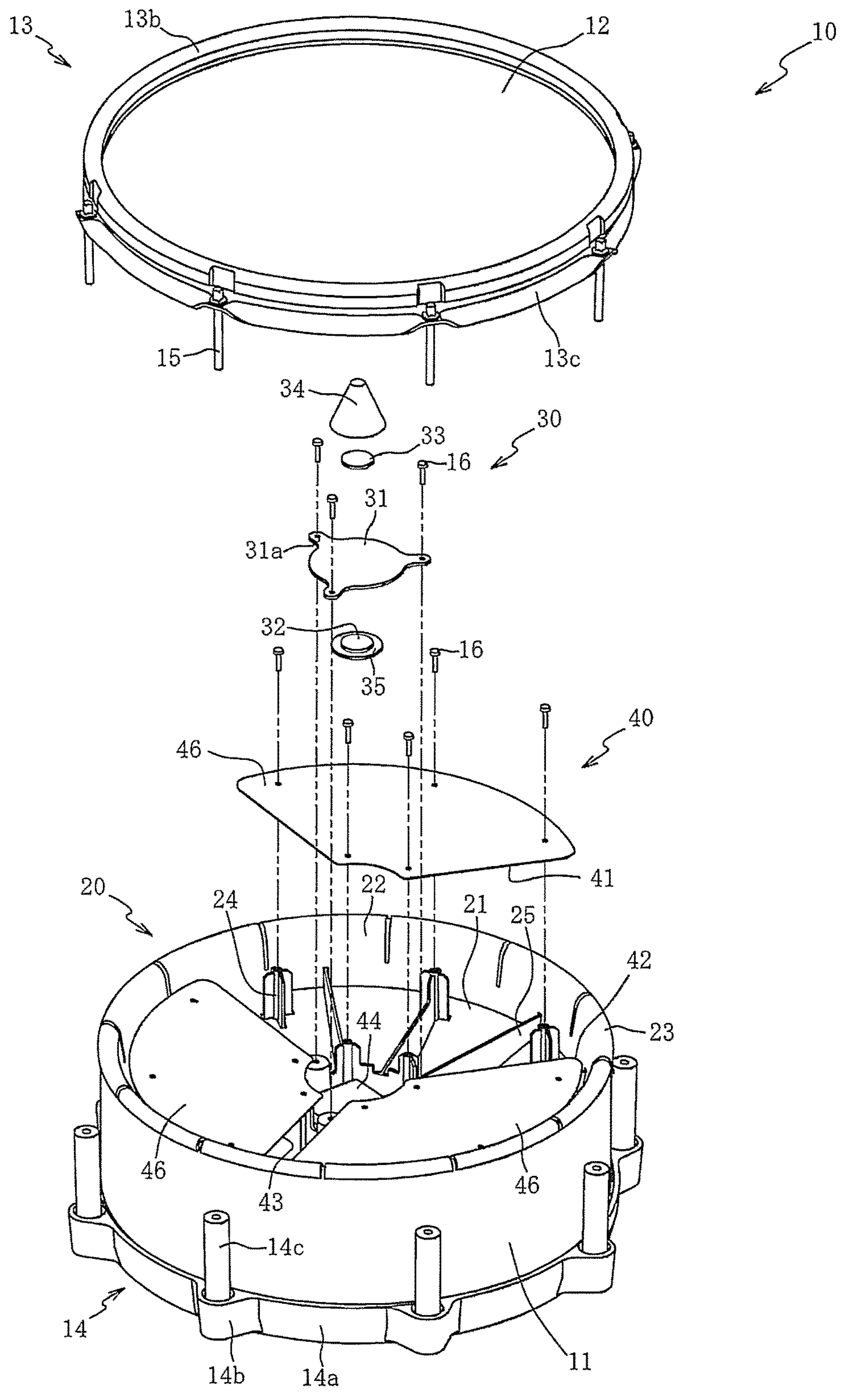
FIG. 1 is an exploded perspective view of the electronic percussion instrument according to the first embodiment of the invention.
Figure 2:
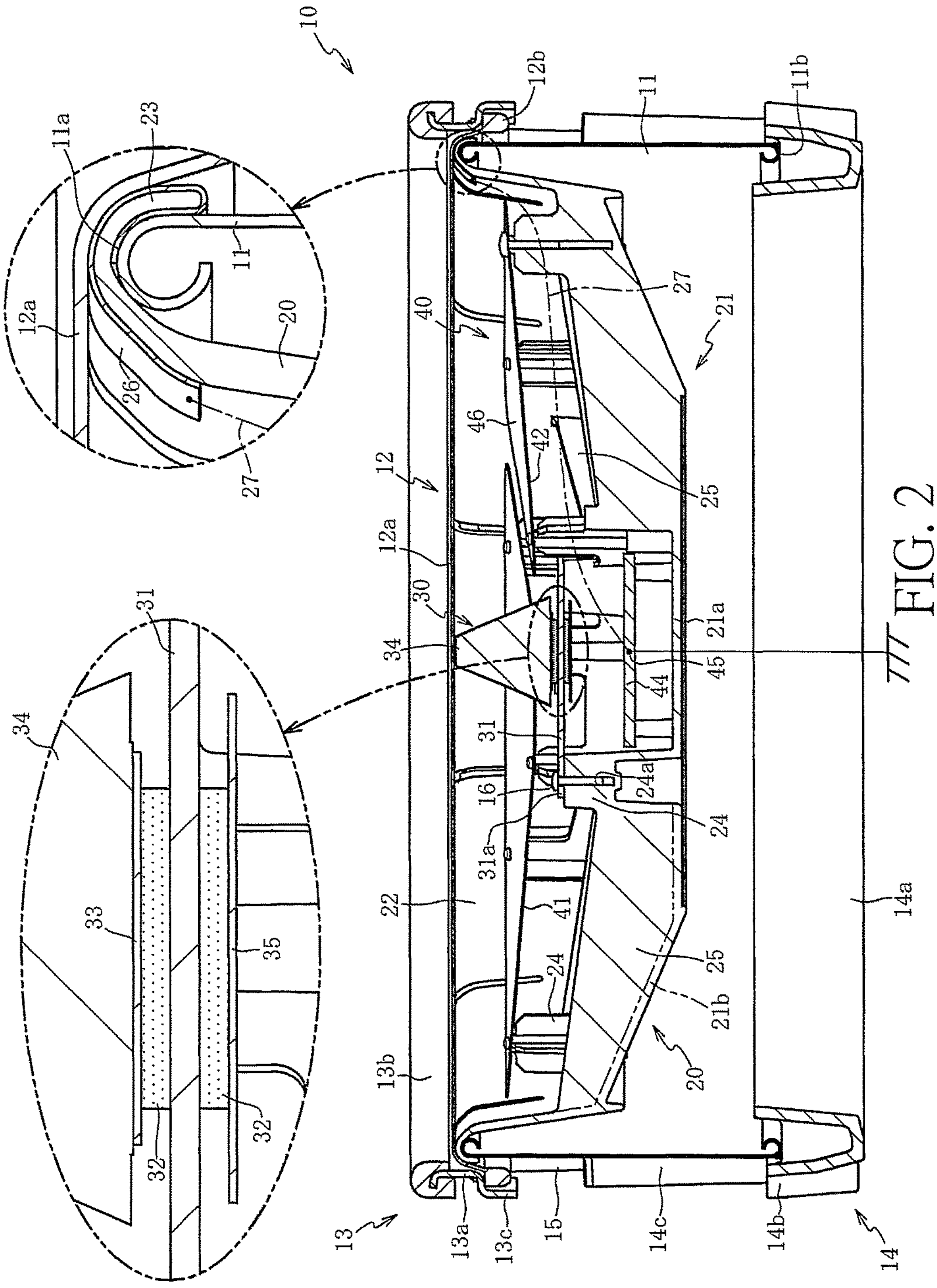
FIG. 2 is a cross-sectional view of the electronic percussion instrument.

Hereinafter, exemplary embodiments of the invention are described with reference to the accompanying figures. First, an electronic percussion instrument 10 is described with reference to FIG. 1 and FIG. 2. FIG. 1 is an exploded perspective view of the electronic percussion instrument 10 according to the first embodiment of the invention and FIG. 2 is a cross-sectional view of the electronic percussion instrument 10. With the exception of a cable 27 indicated by a dashed line in FIG. 2, other wirings are omitted from FIG. 1 and FIG. 2. Moreover, the upper side of the paper surface of FIG. 1 is defined as the top of the electronic percussion instrument 10 and the lower side of the paper surface of FIG. 1 is defined as the bottom of the electronic percussion instrument 10.

As shown in FIG. 1 and FIG. 2, the electronic percussion instrument 10 is an electronic musical instrument that simulates a drum to be played with use of a stick or the like held by a performer. The electronic percussion instrument 10 includes a shell 11 (body part), a head 12, a rim 13, a fixing part 14, a frame 20, a sensor part 30, and a capacitance sensor 40. The shell 11 has an axial end surface that is opened on the side of a first end 11*a*, which is an upper end. The head 12 covers the axial end surface of the shell 11 on the side of the first end 11*a* to be struck on the front surface. The rim 13 is attached to the outer peripheral portion of the head 12. The fixing part 14 is fixed to the shell 11 and the rim 13 is attached to the fixing part 14. The frame 20 is disposed on the back side of the head 12 and inside the shell 11. The sensor part 30 is attached to the frame 20. The capacitance sensor 40 is for detecting change of a capacitance.

When the performer strikes the head 12 or the rim 13 with a stick or the like (not shown), the electronic percussion instrument 10 outputs a detection result obtained from the sensor part 30 and the capacitance sensor 40 based on the striking to a sound source device (not shown) and generates a musical sound signal by the sound source device based on the detection result from the sensor part 30 and the capacitance sensor 40. The musical sound signal is outputted to a speaker (not shown) via an amplifier (not shown) so as to emit an electronic musical sound from the speaker based on the musical sound signal.

The shell 11 is a cylindrical metallic (conductor) member that is opened on the axial end surface on the side of the first end 11*a* and an axial end surface on the side of a second end 11*b*, wherein the second end 11*b* is a lower end. The first end 11*a* and the second end 11*b* are rounded on the edges. The shell 11 has an outer diameter of 14 inches. Nevertheless, the outer diameter of the shell 11 is not limited to 14 inches. The shell 11 may have an outer diameter smaller than or greater than 14 inches. In addition, the shell 11 is not necessarily formed of a metal. The shell 11 may also be formed of a non-metallic conductor (e.g., a conductive polymer or graphite).

The head 12 is a member configured as a striking surface to be struck by the stick or the like held by the performer, and includes a disc-shaped membrane member 12*a* and an annular frame part 12*b* that is disposed on the outer peripheral edge of the membrane member 12*a*. The membrane member 12*a* is formed of a mesh-like raw material obtained by knitting synthetic fibers (insulator) or a film-like raw material formed of a synthetic resin (insulator). The frame part 12*b* is a metallic portion, to which the outer peripheral edge of the membrane member 12*a* is bonded. Nevertheless, the outer peripheral edge of the membrane member 12*a* is not necessarily bonded to the frame part 12*b*. For example, it is also possible to wind the outer peripheral edge of the membrane member 12*a* around a core metal and swage it to wrap the periphery thereof with the frame part 12*b*, so as to fix the outer peripheral edge of the membrane member 12*a* to the frame part 12*b*.

The rim 13 is an annular member that applies tension to the head 12. The rim 13 includes a cylindrical frame contact part 13*a*, an annular elastic member 13*b*, and an annular flange part 13*c*. The lower end (the end portion on the side of the second end 11*b*) of the frame contact part 13*a* is in contact with the frame part 12*b*. The elastic member 13*b* is disposed over the entire circumference on the upper end (the end portion on the side opposite to the end portion in contact with the frame part 12*b*) of the frame contact part 13*a*. The flange part 13*c* protrudes in a radial direction from the lower end of the frame contact part 13*a*.

The frame contact part 13*a* is a portion for pressing the frame part 12*b*, and the inner diameter of the frame contact part 13*a* is set to be greater than the outer diameter of the shell 11 and smaller than the outer diameter of the frame part 12*b*. The elastic member 13*b* is a portion to be struck by the performer and is formed of an elastic material, such as sponge, rubber, and thermoplastic elastomer. Thus, the striking sound that is generated when the rim 13 is struck is reduced. The flange part 13*c* has a plurality of holes for respectively inserting bolts 15.

The fixing part 14 is a member for fixing the rim 13 to the shell 11. The fixing part 14 includes an annular part 14*a*, a plurality of overhang parts 14*b*, and a plurality of fastened parts 14*c*. The annular part 14*a* is fixed to the second end 11*b* of the shell 11 by screws (not shown). The overhang parts 14*b* are formed to protrude outward in the radial direction from the annular part 14*a*. The fastened parts 14*c* respectively extend from the overhang parts 14*b* toward the side of the first end 11*a*.

The annular part 14*a* is an annular portion made of a synthetic resin. The overhang parts 14*b* are portions for disposing the fastened parts 14*c* on the outer periphery side of the annular part 14*a*, and are formed integrally with the annular part 14*a*. The fastened parts 14*c* are cylindrical metallic portions having threads on the inner peripheral surfaces for fastening the bolts 15, and are fixed to the overhang parts 14*b* by screws (not shown). Materials of the annular part 14*a*, the overhang parts 14*b*, and the fastened parts 14*c* are not particularly limited. For example, the annular part 14*a* and the overhang parts 14*b* may be formed of a metal, such as zinc die casting, and the fastened parts 14*c* may be formed of a synthetic resin having predetermined strength and rigidity (e.g., polyetheretherketone resin and polyphenylene sulfide resin). It is also possible to use a cylindrical member that has no threads thereon in place of the fastened part 14*c*. The bolt 15 may pass through the cylindrical member and a nut may be attached to the tip of the bolt 15 passing through the overhang part 14*b*, so as to fasten the bolt 15 to the fixing part 14. The cylindrical member may be made of a metal, a synthetic resin, or the like.

The frame 20 is a black bowl-shaped member for connecting various members, such as the sensor part 30 and the capacitance sensor 40, and the shell 11 to arrange the various members inside the shell 11, and the frame 20 is formed of a synthetic resin (insulator). The frame 20 includes a bottom part 21, a sidewall part 22, a hook part 23, a plurality of protruding parts 24, and a plurality of ribs 25. The bottom part 21 is disposed at a predetermined distance from the head 12. The sidewall part 22 rises from the outer peripheral edge of the bottom part 21. The hook part 23 is formed on the outer peripheral edge of the sidewall part 22. The protruding parts 24 and the ribs 25 extend from the bottom part 21 toward the head 12.

The bottom part 21 has a central part 21*a* and an inclined part 21*b*. The central part 21*a* is formed in parallel to the head 12 which is not pressed and is in a non-vibrating state. The inclined part 21*b* is inclined to be closer to the head 12 from the outer peripheral edge of the central part 21*a* toward the shell 11. A height from the central part 21*a* to the head 12 is 75 mm and a height from the outer peripheral edge of the inclined part 21*b* to the head 12 is 45 mm.

The hook part 23 is a portion to be hooked on the first end 11*a* of the shell 11, and is formed along the shape of the first end 11*a*. The protruding parts 24 are shaft-like portions, to which the various members are attached. A base end of the protruding part 24 is formed integrally with the bottom part 21, and a front end thereof is formed with a female screw hole 24*a* for fastening a fixing screw 16. The ribs 25 are plate-shaped portions for ensuring the strength and rigidity of the frame 20, and are formed integrally with the bottom part 21 and the protruding parts 24.

The sensor part 30 is a sensor for detecting whether the electronic percussion instrument 10 is struck, and is disposed at the center of the frame 20. The sensor part 30 includes a plate 31, a head sensor 33, a cushion 34, and a rim sensor 35. The plate 31 is attached to the front end of the protruding part 24 by the fixing screw 16. The head sensor 33 is bonded to the plate 31 on the side of the head 12 via a double-sided tape 32. The cushion 34 is bonded to the head sensor 33 on the side of the head 12. The rim sensor 35 is bonded to the plate 31 on the side of the bottom part 21 via the double-sided tape 32.

The plate 31 is a disc-shaped metallic member formed with three fixed parts 31*a*, which protrude outward in the radial direction, to be fixed to the front end of the protruding part 24 that extends from the central part 21*a* of the bottom part 21 by the fixing screw 16. A height from the central part 21*a* to the plate 31 is set to 36 mm. The double-sided tape 32 is a disc-shaped member having cushioning property.

The head sensor 33 is a disc-shaped sensor for detecting striking on the head 12, and is composed of a piezoelectric element. The double-sided tape 32 has a diameter smaller than the diameter of the head sensor 33. Because the outer periphery side of the head sensor 33 is easily deformable, the detection sensitivity of the head sensor 33 is ensured.

Nevertheless, the diameter of the double-sided tape 32 is not necessarily smaller than the diameter of the head sensor 33. It is also possible to form the double-sided tape 32 into a ring shape to make the diameter of the head sensor 33 and the outer diameter of the double-sided tape 32 substantially equal. In this case, because the center side of the head sensor 33 is easily deformable, the detection sensitivity of the head sensor 33 is ensured.

The cushion 34 is a truncated conical cushioning material that is formed of an elastic material such as sponge, rubber, and thermoplastic elastomer. A height of the cushion 34 (along the axial direction of the shell 11), in a state where no load is applied, is set to be slightly greater than the distance from the head sensor 33 to the head 12 attached to the shell 11. Because the cushion 34 is elastically deformable between the head 12 attached to the shell 11 and the head sensor 33, the head 12 that vibrates due to the striking and the cushion 34 are maintained in a contact state to transmit the vibration of the head 12 to the head sensor 33. An elastic modulus of the cushion 34 or an elastic deformation amount of the cushion 34 deformed between the head 12 and the head sensor 33 may be adjusted to reduce the elastic force of the cushion 34, so as to prevent the elastic force of the cushion 34 from hindering the vibration of the head 12.

The rim sensor 35 is a disc-shaped sensor for detecting striking on the rim 13, and is composed of a piezoelectric element. The diameter of the double-sided tape 32 is smaller than the diameter of the rim sensor 35. Accordingly, it is possible to prevent the double-sided tape 32 from hindering the deformation of the rim sensor 35 and thus the detection sensitivity of the rim sensor 35 is ensured. It is also possible to form the double-sided tape 32 into a ring shape and make the diameter of the rim sensor 35 and the outer diameter of the double-sided tape 32 substantially equal to each other, such that the center side of the rim sensor 35 is easily deformable so as to ensure the detection sensitivity of the rim sensor 35.

The capacitance sensor 40 is a self-capacitance type sensor that detects whether a detected conductor, such as a human body, approaches the head 12. The capacitance sensor 40 includes a first electrode 41, a second electrode 42, a third electrode 43, and a control board 44 electrically connected to the first electrode 41, the second electrode 42, and the third electrode 43 (hereinafter referred to as "the electrodes 41, 42, and 43").

The electrodes 41, 42, and 43 are fan-shaped conductors (e.g., metal, conductive polymer, or graphite) centered on an axial center of the shell 11 and respectively face the head 12. A radial dimension of a surface of each of the electrodes 41, 42, and 43, which faces the head 12, is set so that each of the electrodes 41, 42, and 43 is close to the sensor part 30 and the frame 20 without interfering with the sensor part 30 and the frame 20.

The electrodes 41, 42, and 43 are fixed to the front ends of the protruding parts 24 by the fixing screws 16 and are arranged at a predetermined distance from the bottom part 21 and the head 12. The electrodes 41, 42, and 43 have the same shape. Therefore, by reducing the number of types of the components, the component cost of the electrodes 41, 42, and 43 is reduced.

The electrodes 41, 42, and 43 are inclined so that the surfaces facing the head 12 incline away from the head 12 toward the axial center of the shell 11 (inward in an axially perpendicular direction). The electrodes 41, 42, and 43 adjacent to one another in the circumferential direction of the shell 11 can be regarded as an electrode that has a circular shape in a top view and is recessed like a mortar toward the side of the second end 11*b*, and is divided equally in the circumferential direction of the shell 11.

A film 46 forming of a black synthetic resin (insulator) is bonded to the surface of each of the electrodes 41, 42, and 43 on the side of the head 12. In a case where each of the electrodes 41, 42, and 43 is formed of a metal foil, the strength and rigidity can be ensured by bonding the film 46 that is strong and rigid respectively to the electrodes 41, 42, and 43. Nevertheless, the electrodes 41, 42, and 43 are not necessarily formed of the metal foil. It is also possible to bond electrodes 41, 42, and 43 that are conductor films formed of a conductive polymer to the film 46 or apply electrodes 41, 42, and 43 that are conductive paint to the film 46. Moreover, the electrodes 41, 42, and 43 may be formed of a conductive plate material that has predetermined strength and rigidity. In that case, it is not necessary to bond the film 46 to the electrodes 41, 42, and 43.

In addition, the film 46 may suppress dust from getting onto the electrodes 41, 42, and 43. Furthermore, in the case that the head 12 is like a mesh, since the black film 46 has the same color as the black frame 20 that is visible through the head 12, it is difficult to visually recognize the electrodes 41, 42, and 43 through the head 12.

A method of assembling the electronic percussion instrument 10 is described below. First, the fixing part 14 is attached to the second end 11*b* of the shell 11, and the control board 44, the sensor part 30, and the electrodes 41, 42, and 43 are attached to the frame 20. Next, the frame 20 is inserted into the shell 11 from the side of the bottom part 21 to hook the hook part 23 on the first end 11*a*. At this time, a conductive sheet 26 connected to a reference potential point 45 (ground pattern) of the control board 44 by the cable 27 is held between the first end 11*a* and the hook part 23. The conductive sheet 26 is a sheet obtained by bonding a metal foil and a synthetic resin film, and the side of the metal foil is in contact with the shell 11.

Then, the surface of the shell 11 on the side of the first end 11*a* is covered by the head 12. At this time, the conductive sheet 26 is bent along the frame 20 and held between the head 12 and the hook part 23, so as to position a connection portion between the conductive sheet 26 and the cable 27 in a space surrounded by the head 12 and the frame 20.

Finally, the frame contact part 13*a* of the rim 13 is brought into contact with the frame part 12*b* of the head 12, and the bolt 15 inserted into the flange part 13*c* of the rim 13 is fastened to the fastened part 14*c* of the fixing part 14. In this manner, the frame part 12*b* is pressed by the frame contact part 13*a* to apply tension to the head 12 (the membrane member 12*a*), so as to assemble the electronic percussion instrument 10. Moreover, since the head 12 is pressed against the shell 11, the conductive sheet 26 held between the head 12 and the frame 20 and between the frame 20 and the shell 11 is fixed to the frame 20.

Nevertheless, a crimp terminal may be disposed in place of the conductive sheet 26, and the cable 27 may be fixed to the shell 11 by screwing the crimp terminal to the shell 11. In addition, the cable 27 may be connected to the shell 11 by soldering. In these cases, in order to remove the frame 20 from the shell 11, it is necessary to unscrew the crimp terminal or melt the solder to detach the cable 27 from the shell 11. Then, in order to connect the cable 27 and the shell 11 again, it is necessary to screw and fix the crimp terminal or perform soldering again. On the other hand, in this embodiment, the conductive sheet 26 makes it easy to attach and detach the cable 27 and the shell 11. Therefore, attachment and detachment of the shell 11 and the frame 20 are easy to perform.

Figure 3:
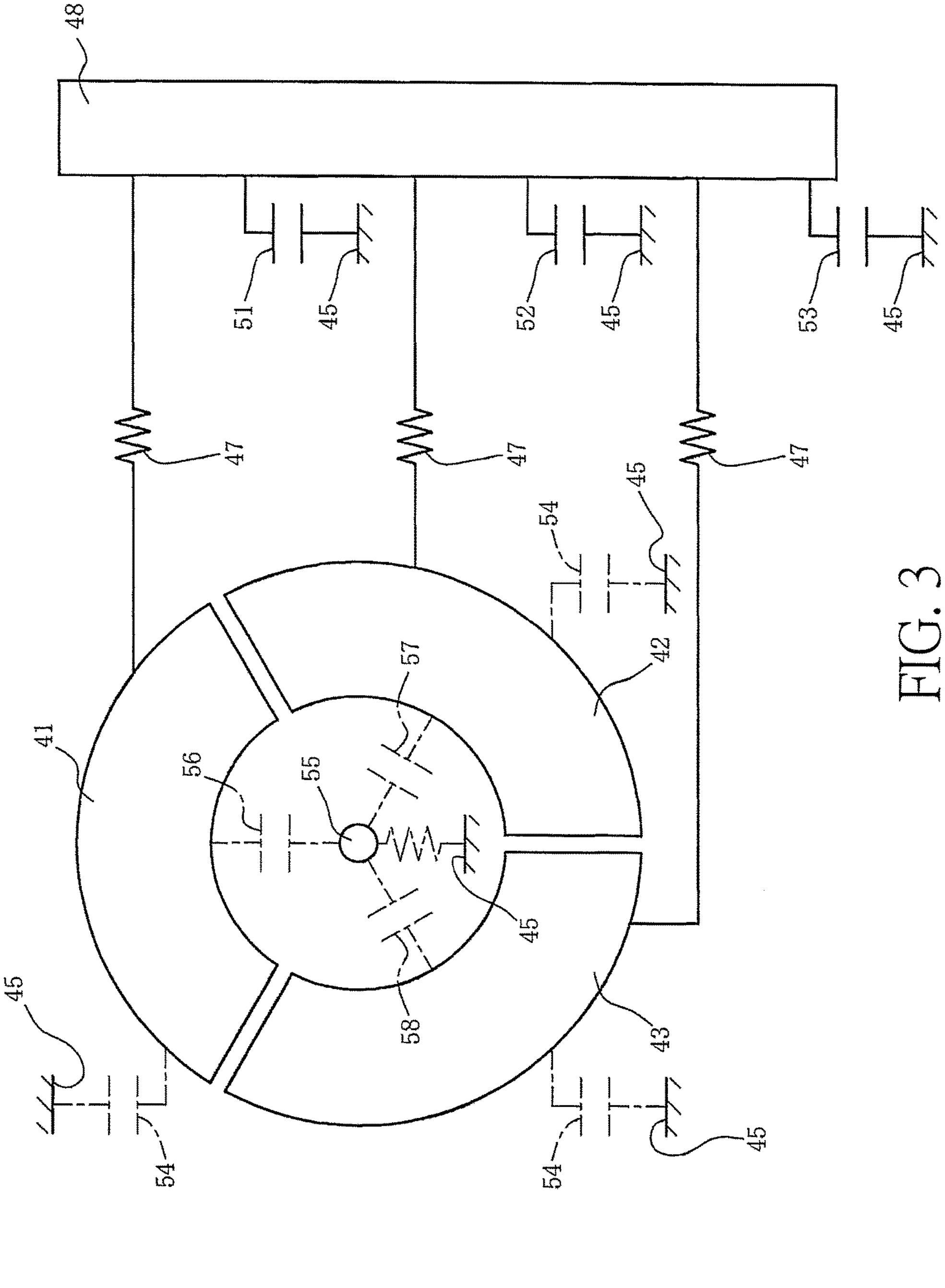
FIG. 3 is a schematic diagram showing the electrical configuration of the capacitance sensor.

Next, a detection method of the capacitance sensor 40 is described with reference to FIG. 3. FIG. 3 is a schematic diagram showing an electrical configuration of the capacitance sensor 40. As shown in FIG. 3, in the capacitance sensor 40, the electrodes 41, 42, and 43 are connected to a controller 48 via a resistor 47 respectively. Sampling capacitors 51, 52, and 53 respectively corresponding to the electrodes 41, 42, and 43 are disposed between the controller 48 and the reference potential point 45.

The resistors 47, the controller 48, and the sampling capacitors 51, 52, and 53 are elements disposed in the control board 44 (see FIG. 2). The resistors 47 are elements for electrostatic protection. The controller 48 is a control circuit, on which various switches, CPU, or the like are mounted. Resistance values of the resistors 47 and capacitances of the sampling capacitors 51, 52, and 53 are set as appropriate according to the desired performance.

A predetermined capacitance (parasitic capacitance) is generated between the first electrode 41 and a conductor (wirings in the shell 11 (see FIG. 2) or the control board 44), which is connected to the reference potential point 45 in the control board 44 and located within a predetermined distance around the first electrode 41, or a grounded portion (connected to the reference potential point 45 such as the ground) of the floor, wall, etc. Whatever has the parasitic capacitance serves as a parasitic capacitance capacitor 54. When a detected conductor 55, such as a human body, approaches the first electrode 41, a new parasitic capacitance capacitor 56 is formed between the first electrode 41 and the detected conductor 55, and the parasitic capacitance around the first electrode 41 (a total of the parasitic capacitance capacitors 54 and 56) increases by the capacitance (parasitic capacitance) of the parasitic capacitance capacitor 56. In addition, the parasitic capacitance of the parasitic capacitance capacitor 56 increases as the distance between the first electrode 41 and the detected conductor 55 is shortened.

Because the human body 55 has a sufficiently large capacitance compared to the parasitic capacitance of the parasitic capacitance capacitor 56, the human body 55 can be regarded as being connected (grounded) to the reference potential point 45, such as the ground. Therefore, the parasitic capacitance capacitor 56 is formed between the human body 55 and the first electrode 41.

The capacitance sensor 40 repeats a process of sending electric charge to the first electrode 41 by a switching operation inside the controller 48, so as to charge the parasitic capacitance capacitors 54 and 56 and move the charged electric charge to the sampling capacitor 51. The capacitance sensor 40 detects the change of the total parasitic capacitance of the parasitic capacitance capacitors 54 and 56, based on the number of times of repeating the process until a voltage of the sampling capacitor 51 becomes equal to or greater than a predetermined value, to determine whether the detected conductor 55 approaches the first electrode 41.

As the total parasitic capacitance of the parasitic capacitance capacitors 54 and 56 increases (as the distance between the first electrode 41 and the detected conductor 55 is shortened), the amount of charge moving from the parasitic capacitance capacitors 54 and 56 to the sampling capacitor 51 in one cycle increases. Thus, the number of times of repeating the process decreases. Accordingly, the capacitance sensor 40 is able to determine how close the detected conductor 55 (e.g., the performer's hand) is to the head 12 and to what extent the detected conductor 55 is pressed against the head 12, based on the number of times of repeating the process.

For example, the capacitance sensor 40 sets the number of times of repeating the process (e.g., 100) when the detected conductor 55 (a finger of the performer's hand) contacts the head 12 at a position facing the first electrode 41 as a first threshold value, and sets the number of times of repeating the process (e.g., 120) that is slightly greater than the first threshold value as a second threshold value. The second threshold value is set such that the number of times of repeating the process according to the position of the detected conductor 55 (the performer's hand) during open rim shot is greater than the second threshold value.

If the number of times of repeating the process is equal to or smaller than the first threshold value, the capacitance sensor 40 determines that the head 12 is in contact with the detected conductor 55 (the detected conductor 55 presses the head 12) at the position facing the first electrode 41. In this case, the capacitance sensor 40 is able to determine that the detected conductor 55 strongly presses the head 12 as the number of times of repeating the process decreases. If the number of times of repeating the process is greater than the first threshold value and equal to or smaller than the second threshold value, the capacitance sensor 40 determines that the detected conductor 55 approaches the head 12 at the position facing the first electrode 41 (the head 12 and the detected conductor 55 are slightly away from each other). The capacitance sensor 40 determines that the detected conductor 55 and the head 12 are far away from each other when the number of times of repeating the process is greater than the second threshold value. Further, if the number of times of repeating the process is greater than the first threshold value, the capacitance sensor 40 is able to determine that the detected conductor 55 is being separated from the head 12 as the number of times of repeating the process increases.

The case where the detected conductor 55 approaches the first electrode 41 has been specified above, which also applies to the cases where the detected conductor 55 approaches the second electrode 42 and the third electrode 43. Therefore, descriptions regarding the second electrode 42 and the third electrode 43 are omitted. A parasitic capacitance capacitor 57 is formed between the second electrode 42 and the detected conductor 55 and a parasitic capacitance capacitor 58 is formed between the third electrode 43 and the detected conductor 55.

Because the radial dimension of the surface of each of the electrodes 41, 42, and 43, which faces the head 12, is set so that each of the electrodes 41, 42, and 43 is close to the sensor part 30 and the frame 20 without interfering with the sensor part 30 and the frame 20, the capacitance sensor 40 is able to determine whether the detected conductor 55 approaches (contacts) or presses the head 12 substantially over the entire surface of the head 12. Moreover, because the control board 44 is disposed on the electrodes 41, 42, and 43 on the side of the bottom part 21, the radial dimension of the surface of each of the electrodes 41, 42, and 43 which faces the head 12 is ensured with no interference with the control board 44.

By determining whether or not the detected conductor 55 approaches the electrodes 41, 42, and 43 (formed by dividing one electrode in the circumferential direction of the shell 11) that are adjacent to one another in the circumferential direction of the shell 11, the capacitance sensor 40 is able to detect the position of the detected conductor 55 in the circumferential direction of the shell 11. Because the electrodes 41, 42, and 43 have the same shape, the detection sensitivity that the capacitance sensor 40 has with respect to the electrodes 41, 42, and 43 is uniformized. As a result, the accuracy of detecting the position of the detected conductor 55 in the circumferential direction of the shell 11 is improved and the detection processes that the capacitance sensor 40 performs with respect to the electrodes 41, 42, and 43 are the same.

A condition for the capacitance sensor 40 to detect the change of the capacitance based on the approach of the detected conductor 55 to the first electrode 41 is described below with reference to FIG. 1 and FIG. 2 again, in addition to FIG. 3. Although the description is merely based on the first electrode 41, the same applies to the second electrode 42 and the third electrode 43 as well. Therefore, descriptions regarding the second electrode 42 and the third electrode 43 are omitted.

When a conductor connected to the reference potential point 45 is present between the first electrode 41 and the front surface of the head 12, because the conductor connected to the reference potential point 45 functions as an electrostatic shield, the parasitic capacitance capacitor 56 is not formed between the first electrode 41 and the detected conductor 55. On the other hand, when at least one of a conductor, which is not connected to the reference potential point 45, and an insulator is present between the first electrode 41 and the front surface of the head 12, that is, when a conductor connected to the reference potential point 45 is not present between the first electrode 41 and the front surface of the head 12, the parasitic capacitance capacitor 56 is formed between the first electrode 41 and the detected conductor.

In this embodiment, only the membrane member 12*a* composed of an insulator is positioned between the first electrode 41 and the front surface of the head 12. Thus, the parasitic capacitance capacitor 56 is formed between the first electrode 41 and the detected conductor 55. As a result, the capacitance sensor 40 is able to detect the change of the capacitance caused by the approach of the detected conductor 55 to the first electrode 41.

Next, a playing technique of the electronic percussion instrument 10 is described. When the performer strikes the head 12, the vibration of the head 12 is transmitted to the head sensor 33 via the cushion 34. The vibration caused by the striking of the head 12 is transmitted to the rim sensor 35 via the frame 20, the plate 31, and the double-sided tape 32.

On the other hand, when the performer strikes the rim 13, the vibration caused by the striking of the rim 13 is transmitted to the head sensor 33 and the rim sensor 35 via the rim 13, the frame 20, the plate 31, and the double-sided tape 32. Because the head sensor 33 is in contact with the head 12 through the cushion 34, the head sensor 33 is less likely to be shaken by the vibration from the plate 31 than the rim sensor 35.

As described above, the transmission paths of the vibration to the head sensor 33 and the rim sensor 35 and the ways that the head sensor 33 and the rim sensor 35 are shaken differ between the case of striking the head 12 and the case of striking the rim 13. Therefore, based on the detection results (output level ratio) of the head sensor 33 and the rim sensor 35, which of the head 12 and the rim 13 is struck by the performer can be determined by the sound source device (not shown), so as to emit an electronic musical sound corresponding to the struck portion from the speaker (not shown). The sound source device may also be disposed in the control board 44 or be configured as an external device.

Open rim shot and closed rim shot are playing techniques for striking the rim 13 of an acoustic drum. The open rim shot is to strike the rim 13 and the head 12 at the same time with a stick (not shown), and the closed rim shot is to strike the rim 13 with the stick while the front surface of the head 12 is pressed by hand. When the rim 13 is struck in a state where the capacitance sensor 40 determines that the hand (the detected conductor) 55 does not approach or contact (press) the head 12 (a state where the number of times of repeating the process is greater than the second threshold value), the electronic percussion instrument 10 determines the playing technique as the open rim shot by the sound source device and emits an electronic musical sound corresponding to the open rim shot from the speaker.

On the other hand, when the rim 13 is struck in a state where the capacitance sensor 40 determines that the hand 55 approaches or contacts the head 12 (a state where the number of times of repeating the process is equal to or smaller than the second threshold value), the electronic percussion instrument 10 determines the playing technique as the closed rim shot by the sound source device and emits an electronic musical sound corresponding to the closed rim shot from the speaker. As a result of the above, the electronic percussion instrument 10 is capable of simulating the playing techniques of the acoustic drum.

In addition, there is another playing technique for the acoustic drum, which is to place the hand 55 on the head 12 before and after striking the head 12, so as to attenuate the vibration of the head 12 at an early stage to mute the striking sound. By performing this playing technique, as the strength of pressing the head 12 increases, the vibration of the head 12 is attenuated earlier and the striking sound is muted earlier.

When the head 12 is struck in a state where the capacitance sensor 40 determines that the hand 55 approaches or contacts the head 12, and when the capacitance sensor 40 determines that the hand 55 contacts the head 12 in a state where an electronic musical sound is being emitted in response to the striking on the head 12 (the number of times of repeating the process is equal to or smaller than the first threshold value), the electronic percussion instrument 10 mutes the electronic musical sound emitted from the speaker. Besides, because the capacitance sensor 40 is capable of detecting the strength of the hand 55 that presses the head 12, the electronic musical sound emitted from the speaker may be muted earlier as the strength of pressing the head 12 increases. As a result of the above, the electronic percussion instrument 10 is capable of simulating the playing technique of the acoustic drum.

According to the electronic percussion instrument 10 as described above, the shell 11 of the conductor is connected to the reference potential point 45 via the conductive sheet 26 and the cable 27, and therefore the shell 11 (conductor part) functions as an electrostatic shield. Thus, the change of the capacitance detected by the capacitance sensor 40 due to the approach of the conductor, such as the human body (e.g., foot), to the shell 11 is suppressed. Even if a hole is formed to penetrate the shell 11 in the radial direction or a part of the shell 11 is formed of an insulator such as a synthetic resin, the shell 11 may still function as the electrostatic shield, depending on the shape and size of the hole or the shape and size of the insulator part.

The electrodes 41, 42, and 43 are inclined so that the surfaces facing the head 12 incline away from the head 12 toward the axial center of the shell 11 (inward in the axially perpendicular direction). Because the head 12 is close to the electrodes 41, 42, and 43 on the outer periphery side where the displacement is small during striking, the change of the capacitance that the capacitance sensor 40 detects with respect to the distance between the detected conductor 55 and the head 12 is increased. Consequently, the detection accuracy of the capacitance sensor 40 is improved. Further, because the head 12 is away from the electrodes 41, 42, and 43 on the center side where the displacement is large during striking, the head 12 and the electrodes 41, 42, and 43 are less likely to contact each other. Accordingly, while contact between the head 12 and the electrodes 41, 42, and 43 is suppressed, the detection accuracy of the capacitance sensor 40 is improved.

The electrodes 41, 42, and 43 are attached to the front ends of the protruding parts 24. Thus, by respectively setting the heights of the protruding parts 24, the inclinations of the electrodes 41, 42, and 43 with respect to the bottom part 21 may be set easily, and the shapes of the electrodes 41, 42, and 43 may be set easily by bending the electrodes 41, 42, and 43. In this embodiment, the protruding parts 24 on the axial center side (inner side in the axially perpendicular direction) of the shell 11 are set lower than the protruding parts 24 on the inner peripheral surface side of the shell 11, so as to bend the plate-shaped electrodes 41, 42, and 43 to form the mortar shape as a whole.

When the central part 21*a* of the bottom part 21 is set close to the head 12 and the protruding parts 24 to which the plate 31 is attached are lowered, it becomes easy for the head sensor 33 attached to the plate 31 to receive the vibration caused by the striking on the rim 13. By relatively increasing the height from the central part 21*a* to the head 12 (75 mm in this embodiment) and the height from the central part 21*a* to the plate 31 (36 mm in this embodiment) respectively, the head sensor 33 is less likely to receive the vibration caused by the striking on the rim 13. Thereby, the accuracy of determining the struck position based on the detection results (output level ratio) of the head sensor 33 and the rim sensor 35 is ensured. If the height from the central part 21*a* to the head 12 is 60 mm or more and the height from the central part 21*a* to the plate 31 is 30 mm or more, the accuracy of determining the struck position based on the detection results (output level ratio) of the head sensor 33 and the rim sensor 35 may be ensured.

Next, the second embodiment is described with reference to FIG. 4. The first embodiment illustrates a case where the electrodes 41, 42, and 43 are adjacent to one another in the circumferential direction of the shell 11 (one electrode is divided in the circumferential direction of the shell 11). In contrast thereto, the second embodiment illustrates a case where a first electrode 62, a second electrode 63, and a third electrode 64 (hereinafter referred to as "the electrodes 62, 63, and 64") are adjacent to one another in the radial direction of the rim 13 (shell 11) (one electrode is divided in the radial direction of the shell 11). The same reference numerals are used to denote parts the same as those of the first embodiment. Thus, descriptions thereof are omitted hereinafter.

Figure 4:
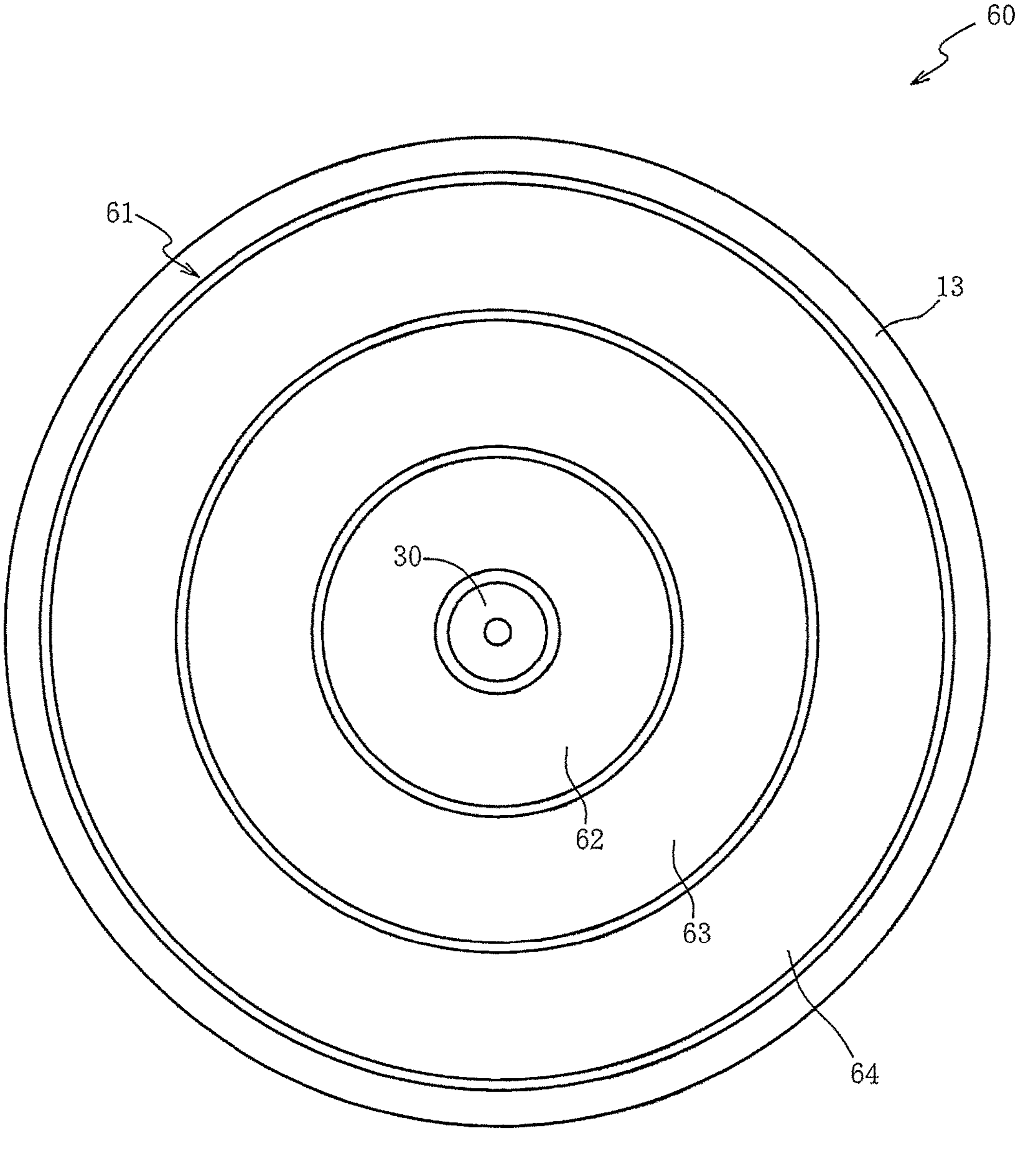
FIG. 4 is a schematic diagram of the electronic percussion instrument according to the second embodiment.

FIG. 4 is a schematic diagram of an electronic percussion instrument 60 according to the second embodiment. As shown in FIG. 4, the electronic percussion instrument 60 is an electronic musical instrument that simulates a drum to be played with use of a stick or the like held by the performer. In the electronic percussion instrument 60, the first electrode 62, the second electrode 63, and the third electrode 64 are arranged in this order from the sensor part 30 to the rim 13 (the shell 11). Each of the electrodes 62, 63, and 64 is an electrode disposed in a self-capacitance type capacitance sensor 61, and is formed of an annular conductor centered on the axial center of the rim 13.

An inner diameter of the first electrode 62 is set so that the first electrode 62 does not interfere with the sensor part 30. An inner diameter of the second electrode 63 is set greater than an outer diameter of the first electrode 62. An inner diameter of the third electrode 64 is set greater than an outer diameter of the second electrode 63 and an outer diameter of the third electrode 64 is set smaller than the inner diameter of the rim 13.

The electrodes 62, 63, and 64 that are adjacent to one another in the radial direction of the rim 13 can be regarded as one electrode that has a circular shape in the top view and is divided in the radial direction. Thus, the capacitance sensor 61 determines whether or not the detected conductor 55 respectively approaches the electrodes 62, 63, and 64, so as to detect the position of the detected conductor 55 in the radial direction of the rim 13. As a result, the electronic percussion instrument 60 is able to differentiate the electronic musical sounds that are respectively emitted from the speaker when the performer puts the hand 55 on the center side of the head 12 (the axial center side of the rim 13) and when the performer puts the hand 55 on the outer periphery side of the head 12 (the side of the rim 13).

Next, the third embodiment is described with reference to FIG. 5. The first embodiment illustrates a case where the electrodes 41, 42, and 43 are attached to the front ends of multiple protruding parts 24 that extend from the bottom part 21. In contrast thereto, the third embodiment illustrates a case where an electrode surface 73*a* is formed on a bottom part 72 for disposing the electrodes 41, 42, and 43. The same reference numerals are used to denote parts the same as those of the first embodiment. Thus, descriptions thereof are omitted hereinafter.

Figure 5:
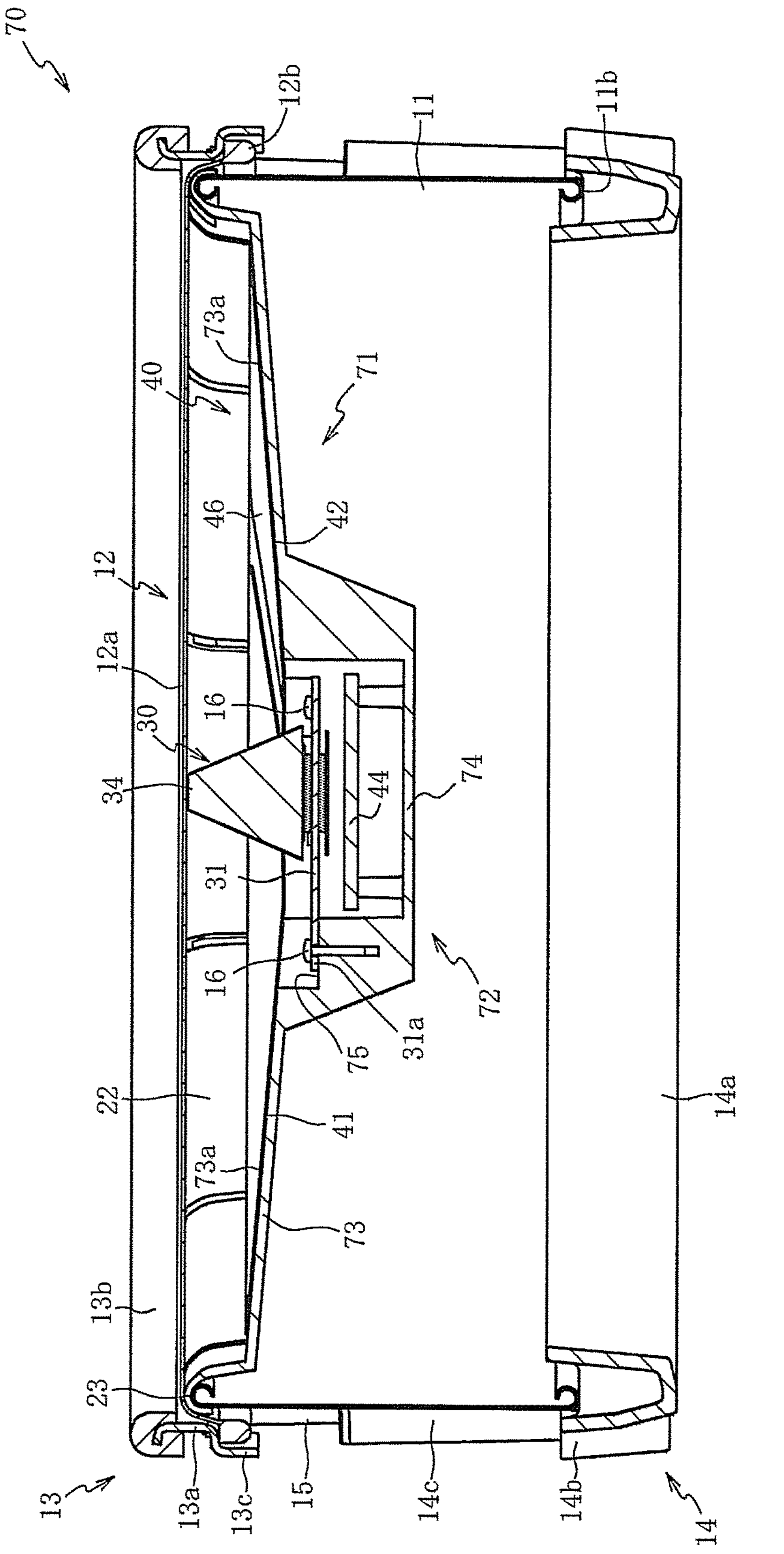
FIG. 5 is a cross-sectional view of the electronic percussion instrument according to the third embodiment.

FIG. 5 is a cross-sectional view of an electronic percussion instrument 70 according to the third embodiment. As shown in FIG. 5, the electronic percussion instrument 70 is an electronic musical instrument that simulates a drum to be played with use of a stick or the like held by the performer. A frame 71 of the electronic percussion instrument 70 is a bowl-shaped member for disposing various members inside the shell 11, and the frame 71 is formed of a synthetic resin (insulator). The frame 71 includes the bottom part 72, a sidewall part 22, and a hook part 23. The bottom part 72 is disposed at a predetermined distance from the head 12. The sidewall part 22 rises from the outer peripheral edge of the bottom part 72. The hook part 23 is formed on the outer peripheral edge of the sidewall part 22.

The bottom part 72 includes an inclined part 73, a central part 74, and a recessed part 75. The inclined part 73 is connected to the sidewall part 22 on the outer peripheral edge. The central part 74 is formed by recessing the center of the inclined part 73 toward the side of the second end 11*b*. A part of the edge of the inclined part 73 on the side of the central part 74 is recessed slightly toward the side of the second end 11*b* to form the recessed part 75. The control board 44 is attached to the central part 74. In the recessed part 75, the fixed parts 31*a* of the plate 31 are fixed by the fixing screws 16.

The inclined part 73 is a portion recessed toward the side of the second end 11*b* into a mortar shape. The inclined part 73 is inclined so that the electrode surface 73*a*, which is a surface facing the head 12, inclines away from the head 12 toward the axial center of the shell 11 (inward in the axially perpendicular direction). The electrodes 41, 42, and 43, each of which is a conductor film formed of a metal or a conductive polymer, may be attached or screwed to the electrode surface 73*a*, so as to facilitate installing the electrodes 41, 42, and 43 along the shape or inclination of the electrode surface 73*a*. Moreover, a conductive paint may be applied to the electrode surface 73*a* to facilitate forming the electrodes 41, 42, and 43 along the shape or inclination of the electrode surface 73*a*. The shapes or inclinations of the electrodes 41, 42, and 43 can be set easily and the installation work or formation work for the electrodes 41, 42, and 43 can be performed easily.

Because the electrode surface 73*a* is inclined away from the head 12 toward the axial center of the shell 11, the electrodes 41, 42, and 43 are inclined away from the head 12 toward the axial center of the shell 11 in the same manner. Because the head 12 is close to the electrodes 41, 42, and 43 on the outer periphery side and away from the electrodes 41, 42, and 43 on the center side, as in the first embodiment, contact between the head 12 and the electrodes 41, 42, and 43 is suppressed and the detection accuracy of the capacitance sensor 40 is improved.

The above illustrates the invention on the basis of the exemplary embodiments. However, it should be understood that the invention is not limited to any of the exemplary embodiments, and various modifications or alterations may be made without departing from the spirit of the invention. For example, the above embodiments illustrate that the shell 11 has a cylindrical shape, but the invention is not limited thereto. It is possible to form the shell into a tubular shape other than the cylindrical shape. The shapes of the head, the rim, the electrodes, and so on are determined according to the shape of the shell.

The above embodiments illustrate a case of applying the invention to the electronic percussion instruments 10, 60, and 70 that simulate drums, but the invention is not limited thereto. It is possible to apply the invention to an electronic percussion instrument that simulates a percussion instrument other than drums, in which the tubular body part (shell) is opened on at least one axial end surface and the head is attached to the opened axial end surface. The percussion instrument other than drums may be cajón, conga, bongo, timbales, timpani, etc., for example.

In the case of an electronic percussion instrument that simulates cajón, conga, or bongo, since the head is directly struck by hand, the hand's striking on the head may be detected by the capacitance sensors 40 and 61. Moreover, the capacitance sensors 40 and 61 are able to detect the struck position on the head, so as to emit an electronic musical sound corresponding to the struck position from the speaker.

Besides, there is a technique of playing an acoustic cajón, which is to put the foot in contact with the head and slide the foot (rub the head with the foot). The capacitance sensors 40 and 61 are able to detect the position of the foot or change of the position of the foot. Furthermore, there is a technique of playing an acoustic timpani, which is to rub the head with a super ball attached to the tip of a pin. When a metallic stick is held by a human body, a parasitic capacitance is generated between the human body and the first electrodes 41 and 62, the second electrodes 42 and 63, and the third electrodes 43 and 64 via the stick. Thereby, the capacitance sensors 40 and 61 are able to detect the position of the stick. Like these, the electronic percussion instrument is capable of simulating the acoustic percussion instrument playing techniques of rubbing the head.

The above first and third embodiments illustrate that the electrodes 41, 42, and 43 are adjacent to one another in the circumferential direction of the shell 11 (one electrode is divided in the circumferential direction of the shell 11), and the above second embodiment illustrates that the electrodes 62, 63, and 64 are adjacent to one another in the radial direction of the rim 13 (the shell 11) (one electrode is divided in the radial direction of the shell 11). However, the invention is not limited thereto. It is also possible to include only one electrode in the capacitance sensor.

In that case, in order to enable the capacitance sensor to detect the detected conductor 55 over substantially the entire surface of the head 12, it is necessary to increase the area of the surface of the electrode that faces the head 12. As the area of the electrode increases, the parasitic capacitance between the electrode and the reference potential point 45 increases. Therefore, the change of the parasitic capacitance caused by the approach of the detected conductor to the electrode becomes relatively small, and the S/N ratio of the capacitance sensor (the change of the parasitic capacitance caused by the approach of the detected conductor 55/the parasitic capacitance between the electrode and the reference potential point 45) decreases. The detection accuracy of the capacitance sensor may be enhanced by increasing the capacitances of the sampling capacitors 51, 52, and 53, but it will increase the detection time and impair the followability when the playing technique is changed. For example, if the rim 13 is struck immediately after the detected conductor 55, which has been brought close to the head 12, is separated from the head 12, due to the increase of the detection time (a delay in determination), the capacitance sensor may determine that the rim 13 is struck when the detected conductor 55 is close to the head 12.

Thus, by dividing the electrode into a plurality of electrodes and reducing the size of each divided electrode, the increase of the detection time is prevented to ensure the followability when the playing technique is changed as well as ensure the S/N ratio of the capacitance sensor. If the outer diameter of the shell 11 is 10 inches or less, since the size of one electrode is small, the S/N ratio of the capacitance sensor can be ensured without dividing the one electrode.

Moreover, the one electrode is not necessarily divided into three electrodes and may also be divided into two, four, or more electrodes. Further, the direction in which the one electrode is divided is not limited to the circumferential direction or the radial direction of the shell 11. The one electrode may be divided so that each of the divided electrodes faces the head 12. In that case, the position of the detected conductor 55 in a direction parallel to the front surface of the head 12 can be detected.

By forming the divided electrodes into substantially the same shape, the capacitance sensor has uniform detection sensitivity when the detected conductor 55 approaches any of the electrodes. Accordingly, the accuracy of detecting the position of the detected conductor 55 in the direction parallel to the front surface of the head 12 is improved and the detection processes that the capacitance sensor 40 performs for the electrodes are the same.

The above embodiments illustrate that the capacitance sensors 40 and 61 are self-capacitance type, but the invention is not limited thereto. It is also possible to use a mutual-capacitance type capacitance sensor. The mutual-capacitance type capacitance sensor supplies electric charge to one of a pair of electrodes and forms an electric field between the pair of electrodes (capacitance is generated), and detects decrease of the capacitance between the pair of electrodes that occurs when a part of the electric field is transferred to the detected conductor 55 due to the approach of the detected conductor 55. For the mutual-capacitance type capacitance sensor, the pair of electrodes that forms the electric field is required. Thus, the electrode pattern and control circuit become complicated. In contrast thereto, the self-capacitance type capacitance sensors 40 and 61 simplify the electrodes and the control circuit and therefore the component cost of the electrodes is reduced.

The above first and third embodiments illustrate that the surfaces of the electrodes 41, 42, and 43 that face the head 12 are inclined away from the head 12 toward the axial center of the shell 11 (inward in the axially perpendicular direction), but the invention is not limited thereto. It is possible to dispose the electrodes 41, 42, and 43 in parallel to the back surface of the head 12. In particular, if the outer diameter of the shell 11 is 10 inches or less, the head 12 has a relatively small displacement on the center side when struck. Therefore, the electrodes 41, 42, and 43 arranged in parallel to the back surface of the head 12 can be close to the head 12 to improve the detection accuracy of the capacitance sensor 40.

The above first embodiment illustrates that the shell 11 is a conductor. However, the invention is not limited thereto, and it is also possible to form the shell 11 with an insulator, such as wood or a synthetic resin. As the dielectric constant of the insulator that forms the shell 11 decreases, the change of the capacitance that the capacitance sensor 40 detects when the conductor, such as human body, approaches the shell 11 is reduced.

When the shell 11 is formed of an insulator, a conductor film is attached to at least one of the inner peripheral surface and the outer peripheral surface of the shell 11, or at least one of the inner peripheral surface and the outer peripheral surface of the shell 11 is coated with a conductive paint, or a conductor plate is disposed between the electrodes 41, 42, and 43 and the shell 11, and then the conductor film, the conductive paint, or the conductor plate (conductor part) on the shell 11 is connected to the reference potential point 45 so as to function as an electrostatic shield. As a result, the change of the capacitance that the capacitance sensor 40 detects when the conductor, such as human body, approaches the shell 11 is reduced. In addition, when the shell 11 is formed of an insulator, at least a part of the frame part 12*b*, the frame contact part 13*a*, the flange part 13*c*, the fastened part 14*c*, the bolt 15, or the sidewall part 22 is formed of a conductor and connected to the reference potential point 45 for the frame part 12*b*, the frame contact part 13*a*, the flange part 13*c*, the fastened part 14*c*, the bolt 15, or the sidewall part 22 (the conductor part) to function as an electrostatic shield. As a result, the change of the capacitance that the capacitance sensor 40 detects when the conductor, such as human body, approaches the electrodes 41, 42, and 43 on the outer side in the axially perpendicular direction of the shell 11 with respect to the conductor part is reduced.

The above first embodiment illustrates that the axial end surface of the shell 11 on the side of the second end 11*b* is opened, but the invention is not limited thereto, and it is possible to close (not open) the axial end surface of the shell 11 on the side of the second end 11*b*. In that case, because the axial end surface of the shell 11 on the side of the second end 11*b* is formed of metal like the shell 11 and is connected (grounded) to the reference potential point 45, when the conductor, such as human body, approaches the axial end surface of the shell 11 on the side of the second end 11*b*, the change of the capacitance detected by the capacitance sensor 40 is suppressed. As a result, it is possible to suppress erroneous detection of the capacitance sensor 40 caused by the approach of the conductor to the axial end surface of the shell 11 on the side of the second end 11*b*.

The above first embodiment illustrates that the film 46 formed of a black synthetic resin is bonded to the surfaces of the electrodes 41, 42, and 43 on the side of the head 12, but the invention is not limited thereto. The film 46 may also be omitted. Moreover, it is also possible to bond the film 46 to the surfaces of the electrodes 41, 42, and 43 on the side of the bottom part 21. In that case, the protruding parts 24 and the film 46 may be formed integrally to bond the electrodes 41, 42, and 43 to the film 46.

The above first embodiment illustrates that the head sensor 33 and the rim sensor 35 are sensors composed of piezoelectric elements, but the invention is not limited thereto. It is possible to use vibration sensors composed of elements other than the piezoelectric elements. Besides, the head sensor for detecting the pressing force from the cushion 34 may also be composed of a pressure-sensitive sensor, such as a membrane switch. In addition, the rim sensor may be composed of a pressure-sensitive sensor, such as a membrane switch that is configured to be pressed by the elastic deformation of the elastic member 13*b* of the rim 13.

The above first embodiment illustrates that the first electrode 41, the second electrode 42, and the third electrode 43 are disposed at the predetermined distance from the head 12, but the invention is not limited thereto. For example, an electrode in the form of a metal foil (conductor film) may be bonded to the back surface or the front surface of the head 12. In that case, it is preferable to bond the conductor film to the back surface of the head 12 so as to prevent damaging the conductor film. When the multiple divided electrodes are bonded to the head 12, the divided electrodes are disposed in contact with the head 12, so as to detect the position of the detected conductor 55 in the direction parallel to the front surface of the head 12. Furthermore, it is possible to knit conductive fibers or wires (electrodes) into the mesh-like head 12. By dividing the positions where the electrodes are knitted (each divided electrode is in contact with the head 12), it is possible to detect the position of the detected conductor 55 in the direction parallel to the front surface of the head 12. Besides, it is possible to form the head 12 with a metal plate or a conductor film so as to make the head 12 itself an electrode.

What is claimed is:

1. An electronic percussion instrument, comprising:

a tubular body part opened on an axial end surface;

a head attached to the axial end surface of the body part and having a front surface to be struck;

a capacitance sensor comprising an electrode, which generates a capacitance with respect to a detected conductor located on a front surface side of the head, and detecting a change of the capacitance corresponding to a distance between the electrode and the detected conductor; and a sensor part for detecting whether the electronic percussion instrument is struck.

2. The electronic percussion instrument according to claim 1, wherein the electrode is disposed on a back surface side of the head, and at least one of a conductor, not connected to a reference potential point, and an insulator is disposed between the front surface of the head and the electrode.

3. The electronic percussion instrument according to claim 2, comprising a frame that is disposed on the back surface side of the head and inside the body part, wherein the frame comprises a bottom part that is disposed at a predetermined distance from a back surface of the head and fixed to the body part, and at a central part of the bottom part, a control board that comprises the reference potential point is disposed on a side of the bottom part with respect to the electrode.

4. The electronic percussion instrument according to claim 3, wherein the electrode of the capacitance sensor is connected to a controller of the control board via a resistor, and a sampling capacitor corresponding to the electrode is disposed between the controller and the reference potential point.

5. The electronic percussion instrument according to claim 1, comprising a conductor part that is disposed on an outer side with respect to the electrode in an axially perpendicular direction of the body part and connected to a reference potential point.

6. The electronic percussion instrument according to claim 5, wherein the body part is conductive and is connected to the reference potential point.

7. The electronic percussion instrument according to claim 5, wherein the conductor part is a conductor plate disposed between the electrode and the body part.

8. The electronic percussion instrument according to claim 5, wherein the conductor part is a conductor film or a coating conductive paint that is attached to at least one of an inner peripheral surface and an outer peripheral surface of the body part.

9. The electronic percussion instrument according to claim 1, wherein the electrode is divided in plurality, each of which faces or is contact with the head.

10. The electronic percussion instrument according to claim 1, wherein the electrode is divided in plurality in a circumferential direction of the body part.

11. The electronic percussion instrument according to claim 1, wherein the electrode is divided in plurality in a radial direction of the body part.

12. The electronic percussion instrument according to claim 1, wherein the electrode is divided in plurality that are formed in the same shape.

13. The electronic percussion instrument according to claim 1, wherein the capacitance sensor detects a change of a parasitic capacitance between the electrode and a reference potential point.

14. An electronic percussion instrument, comprising:

a tubular body part opened on an axial end surface;

a head attached to the axial end surface of the body part and having a front surface to be struck;

a capacitance sensor comprising an electrode, which generates a capacitance with respect to a detected conductor located on a front surface side of the head, and detecting a change of the capacitance corresponding to a distance between the electrode and the detected conductor, wherein the electrode is disposed on a back surface side of the head, and at least one of a conductor, not connected to a reference potential point, and an insulator is disposed between the front surface of the head and the electrode;

a frame that is disposed on the back surface side of the head and inside the body part, wherein the frame comprises a bottom part that is disposed at a predetermined distance from a back surface of the head and fixed to the body part, and at a central part of the bottom part, a control board that comprises the reference potential point is disposed on a side of the bottom part with respect to the electrode; and a plurality of protruding parts that extend from the bottom part toward the head, wherein the electrode is attached to front ends of the protruding parts at a predetermined distance from the head.

15. The electronic percussion instrument according to claim 14, comprising a sensor part that is attached to a center of the frame and detects whether the electronic percussion instrument is struck, wherein the electronic percussion instrument generates a musical sound signal based on a detection result from the sensor part and the capacitance sensor.

16. The electronic percussion instrument according to claim 15, wherein the sensor part comprises a plate attached to front ends of the protruding parts, a head sensor bonded to a surface of the plate on a side of the head, a cushion bonded to the head sensor on the side of the head, and a rim sensor bonded to a surface of the plate on a side of the bottom part.

17. The electronic percussion instrument according to claim 16, wherein a height of the cushion along an axial direction of the body part in a state where no load is applied is set greater than a distance from the head sensor to the head attached to the body part.

18. The electronic percussion instrument according to claim 14, wherein the electrode is inclined so that a surface of the electrode, which faces the head, inclines away from the head toward an inner side in an axially perpendicular direction of the body part.

19. An electronic percussion instrument, comprising:

a tubular body part opened on an axial end surface;

a head attached to the axial end surface of the body part and having a front surface to be struck;

a capacitance sensor comprising an electrode, which generates a capacitance with respect to a detected conductor located on a front surface side of the head, and detecting a change of the capacitance corresponding to a distance between the electrode and the detected conductor, wherein the electrode is disposed on a back surface side of the head, and at least one of a conductor, not connected to a reference potential point, and an insulator is disposed between the front surface of the head and the electrode; and a frame that is disposed on the back surface side of the head and inside the body part, wherein the frame comprises a bottom part that is disposed at a predetermined distance from a back surface of the head and fixed to the body part, and at a central part of the bottom part, a control board that comprises the reference potential point is disposed on a side of the bottom part with respect to the electrode, wherein the bottom part comprises an electrode surface on which the electrode is disposed, wherein the electrode is disposed at a predetermined distance from the back surface of the head and is inclined so that a surface of the electrode, which faces the head, inclines away from the head toward an inner side in an axially perpendicular direction of the body part.

20. An electronic percussion instrument, comprising:

a tubular body part opened on an axial end surface;

a head attached to the axial end surface of the body part and having a front surface to be struck;

a rim attached to an outer peripheral portion of the head;

a capacitance sensor comprising an electrode, which generates a capacitance with respect to a detected conductor located on a front surface side of the head, and detecting a change of the capacitance corresponding to a distance between the electrode and the detected conductor; and a sensor part for detecting whether the electronic percussion instrument is struck, wherein the sensor part comprises a head sensor for detecting striking on the head and a rim sensor for detecting striking on the rim, wherein when the rim is struck in a state where the capacitance sensor determines that the detected conductor does not approach or contact the head, the electronic percussion instrument determines a playing technique as an open rim shot, and when the rim is struck in a state where the capacitance sensor determines that the detected conductor approaches or contacts the head, the electronic percussion instrument determines the playing technique as a closed rim shot.

* * * * *